(12) United States Patent
Liang et al.

(10) Patent No.: US 10,461,820 B2
(45) Date of Patent: Oct. 29, 2019

(54) WIRELESS COMMUNICATION USING WIRELESS ACTIVE ANTENNAS

(71) Applicant: Ping Liang, Newport Coast, CA (US)

(72) Inventors: Ping Liang, Newport Coast, CA (US); Dengkui Zhu, Beijing (CN); Boyu Li, Irvine, CA (US)

(73) Assignee: RF DSP INC., Irvine, CA (US)

( * ) Notice: Subject to any disclaimer, the term of this patent is extended or adjusted under 35 U.S.C. 154(b) by 0 days.

(21) Appl. No.: 16/091,986

(22) PCT Filed: Jul. 9, 2017

(86) PCT No.: PCT/US2017/041282
§ 371 (c)(1),
(2) Date: Oct. 7, 2018

(87) PCT Pub. No.: WO2018/013440
PCT Pub. Date: Jan. 18, 2018

(65) Prior Publication Data
US 2019/0115958 A1 Apr. 18, 2019

Related U.S. Application Data

(60) Provisional application No. 62/360,476, filed on Jul. 11, 2016.

(51) Int. Cl.
*H04L 5/12* (2006.01)
*H04B 7/0452* (2017.01)
(Continued)

(52) U.S. Cl.
CPC ......... *H04B 7/0452* (2013.01); *H04B 7/0456* (2013.01); *H04B 7/0697* (2013.01); *H04B 7/0897* (2013.01); *H04L 5/14* (2013.01)

(58) Field of Classification Search
CPC .. H04B 7/0452; H04B 7/0456; H04B 7/0697; H04B 7/0897; H04L 5/14
(Continued)

(56) References Cited

U.S. PATENT DOCUMENTS

| 9,667,330 B2 | 5/2017 | Liang |
| 9,917,628 B2 | 3/2018 | Liang |
| 2010/0150085 A1* | 6/2010 | Ishii ...................... H04W 72/04 370/329 |

OTHER PUBLICATIONS

Neeraj Choubey "Introducing Facebook's new terrestrial connectivity systems-Terragraph and Project Aries" [Online]. Available at: https://code.facebook.com/posts/1072680049445290/introducing-facebook-s-new-terrestrial-connectivity-systems-terragraph-and-project-aries/.
(Continued)

*Primary Examiner* — Helene E Tayong
(74) *Attorney, Agent, or Firm* — Guosheng Wang; United States Research and Patent Firm

(57) ABSTRACT

This invention presents a Wireless Smart Antenna apparatus (WSA) comprising a Base Station Side Radio Unit (BSSRU) and a User Equipment Side Radio Unit (UESRU), wherein if a BSSRU is distributed in the coverage area of a Base Station (BS), the BSSRU communicates with one or more (BSs) using a first frequency band F1 and simultaneously communicates with one or more UESRUs using a second frequency band F2, or if a BSSRU is integrated into a BS, the BSSRU communicates with the BS baseband through circuits and communicates with one or more UESRUs using the second frequency band F2, wherein a UESRU communicates with one or more distributed or integrated BSSRUs using the second frequency band F2 and simultaneously communicates with one or more User Equipment (UEs) using the first frequency band F1, wherein one or more WSAs enable Multi-User Multiple Input Multiple Output
(Continued)

spatial multiplexing in the F1 frequency band with UEs distributed over their coverage areas.

22 Claims, 5 Drawing Sheets

(51) Int. Cl.
  *H04B 7/06* (2006.01)
  *H04L 5/14* (2006.01)
  *H04B 7/0456* (2017.01)
  *H04B 7/08* (2006.01)
(58) Field of Classification Search
  USPC .......................................................... 375/262
  See application file for complete search history.

(56) References Cited

OTHER PUBLICATIONS

A. Forenza et al. (2016) "Achieving Large Multiplexing Gain in Distributed Antenna Systems via Cooperation with pCell Technology". arXiv:1601.06209. [Online]. Available: http://arxiv.org.
Chih-Lin I et al., "NGFI, the xHaul", in Proc. 2015 IEEE Globecom Workshops, San Diego, CA, USA, Dec. 2015.
A De La Oliva et al., "XHaul: Toward an Integrated Fronthaul/Backhaul Architecture in 5G Networks", IEEE Wireless Communications, vol. 22, No. 5, pp. 32-40, Oct. 2015.

* cited by examiner

WIRELESS COMMUNICATION USING WIRELESS ACTIVE ANTENNAS

This application claims the benefit of U.S. Provisional Application No. 62/360,476, filed on Jul. 11, 2016.

FIELD OF INVENTION

This invention relates generally to wireless communication, and more particularly, to using wireless active antennas to improve the performance of wireless communication systems.

BACKGROUND

To meet the continued fast growing demand of mobile data, the wireless industry needs solutions that can provide very high data rates in a coverage area to multiple users simultaneously including at cell edges at reasonable cost. Currently, the wireless telecom industry is focused on dense deployment of small cells, the so called ultra-dense networks, to increase spatial re-use of wireless spectrum as the solution for meeting the growing mobile data demand. Dense deployment of small cells requires a large number of backhauls and creates highly complex inter-cell interference. One solution to the interference problem is to require careful Radio Frequency (RF) measurement and planning and inter-cell coordination, which significantly increases the cost of deployment and reduces the spectral efficiency. Another solution is the Self-Organizing Network (SON) technology, which senses the RF environments, configures the small cells accordingly through interference and transmitting management, coordinated transmission and handover. SON reduces the need for careful RF measurement and planning at the cost of increased management overhead and reduced spectral efficiency. The backhaul network to support a large number of small cells is expensive to be laid out. On Apr. 13, 2016, Facebook announced Terragraph and project ARIES (Antenna Radio Integration for Efficiency in Spectrum) as a terrestrial connectivity system as described in [1]. Terragraph is a 60 GHz, multi-node wireless system as a fiber replacement to bring high-speed Internet connectivity to dense urban areas. A distribution node is a 60 GHZ repeater that provides backhaul link that carries digital data to and from Wi-Fi (Wireless-Fidelity) or Ethernet access points, small cells, or other distribution node. It is fundamentally different from the wireless active antennas that use multiple layers of spatial multiplexing beamforming in two or more frequency bands and shifting up or down carrier frequencies.

Another method for increasing spatial re-use of wireless spectrum is Multiple-Input and Multiple-Output (MIMO), especially Multi-User MIMO (MU-MIMO). In a wireless communication system, a wireless node with multiple antennas, a network access point or Base Station (all referred to as BS hereafter) or a User Equipment (UE), can use beamforming in the Downlink (DL) or the Uplink (UL) to increase the Signal-to-Noise Ratio (SNR) or Signal-to-Interference-plus-Noise Ratio (SINR), hence the data rate, of the links with other wireless nodes. MU-MIMO can beamform to multiple UEs simultaneously in a frequency and time block, e.g., a Resource Block (RB), i.e., using spatial multiplexing to provide capacity growth without the need of increasing the bandwidth. In a large-scale MIMO or massive MIMO system, a BS may be equipped with many tens to hundreds of antennas to further increase the gain from MIMO and the number of spatially multiplexed data streams. Although a MIMO BS with a large number of antennas can extend its DL coverage range through beamforming, the SINR of UEs can decay quickly as the distance between the BS and an UE increases, because UEs far away from the BS have significantly lower SINRs than UEs close to the BS due to large-scale fading, shadowing, and other factors. In addition, the UL range, and hence the UL channel estimation accuracy, is limited by the transmitting power of UEs. Before the BS knows the channels of the UEs, it is unable to perform beamforming.

To improve the coverage of a MIMO system, there are prior art that distributes the antennas of the BS and the associated RF components (referred to as Radio Units RUs, or Remote Radio Units RRUs) to the coverage area while keeping the MIMO beamforming computation at a central BS to reduce or eliminate the interference among the multiplexed beams. The connection between the BS and a RH is referred to as a fronthaul versus a backhaul that provides user data connection between a BS and an upper layer data server or controller or a core network. One way is to use an optical cable or Line-of-Sight (LoS) wireless link for the fronthaul that carries IQ samples such as in [2] which proposed a "network architecture with transceivers distributed serendipitously without any concept of a cell, exploiting high densification with fixed transmit power to increase spatial multiplexing gain. The transceivers are connected through a fronthaul and cooperate on a large scale to create concurrent spatial channels to multiple users via precoding." As shown in FIG. 5 of [2], the fronthaul connections use fiber, gigabit Ethernet, LoS radio link or coax cable to connect to their pWave radio heads. As stated in [2], "The data center provides I/Q waveforms through fiber connections to RRHs called pWave radios, which consist only of analog-to-digital (A/D), digital-to-analog (D/A), and RF up/down converters, power amplifier and antenna", and "The pCell processing then converts the U streams of user DL samples into N streams of pWave I/Q samples, which are finally transported to the pWave radios. The pWaves convert the I/Q samples to the RF domain and synchronously transmit the waveforms." However, it is well known that the bandwidth required for I/Q (In-phase/Quadrature) samples in such a fronthaul link is several times higher than a backhaul, typically between 6 to 10 times higher. Moreover, the sampling I/Q data rate on the fronthaul is dependent on the number of antennas in the MIMO system and increases as the number of antennas increases in a MIMO network, as pointed out in [3]. This means that such a fronthaul solution requires very high bandwidth fiber connections, or if a wireless link is used to provide the fronthaul connection to transport the I/Q samples, it would require significantly higher wireless spectrum bandwidth than the wireless spectrum needed for the wireless link between a pCell and one or more UEs or more generally between a BS or a RRU and one or more UEs. This is a significant disadvantage and limitation of such a fronthaul based network, especially in the wireless fronthaul case since wireless spectra are scarce resources and higher spectral efficiency is highly preferred.

Prior art RF repeaters suffer the serious shortcomings of amplifying and introducing interference, thus often worsen the network performance. Power gain from a low gain prior art repeater disappears in a few meters if there is a LoS link between the BS and UE, and high gain prior art repeater creates interference to UEs that already have good SNR without the repeaters and worsens their performance. As a result, they were not favored by network operators and their use was limited.

Our PCT application PCT/US14/65853 entitled "Massive MIMO Multi-User Beamforming and Single Channel Full Duplex for Wireless Networks" presented inventions that use a massive MIMO BS to provide backhauls to distributed small cells, which can be generalized to distributed RRUs. Our PCT application PCT/US16/13742 entitled "Beamforming in a MU-MIMO Wireless Communication System With Relays" presented inventions that use a massive MIMO BS to beamform to UEs through distributed amplify-and-forward repeaters (referred to as AFRs) where the wireless connection between the BS and AFRs can use the same bandwidth as the wireless connection between the BS and UEs or between an AFR and UEs. However, in both PCT applications, the distributed RRUs and AFRs are single unit devices that receive a wireless signal from a BS and transmit the signal to one or more UEs, or vice versa. The preferred usage scenario of both cases are at locations where a local SNR gap of the signals at the BS-side antenna(s) and the UE-side antenna(s) exists, where a local SNR gap is defined as the strength of the BS signal outside a local area being significantly higher than the strength of the BS signal inside the local area signal. The SNR gap overcomes the shortcomings of prior art RF repeaters. An example of a local SNR gap is the BS signal inside a building, where the signal at an outdoor position and/or orientation is significantly stronger than indoors, e.g., 20 dB or higher. In such a scenario, the BS-side antenna(s) are placed outdoor to receive a strong BS signal, which is then amplified, forwarded, and transmitted through antenna(s) indoors to improve indoor coverage. The inventions in this application can improve the effectiveness and expand the applicability of the distributed AFRs in areas where a local SNR gap does not exist.

Another prior art moves part of the physical layer to the RRUs to reduce the bit rates required on the fronthaul, as proposed in NGFI (Next Generation Fronthaul Interface) [3], as a case of Xhaul (Crosshaul) [4], the integrated fonthaul and backhaul. The key to NGFI is the selection of the appropriate function split between the Base Band Unit (BBU) and the RRU. However, the function split in the NGFI would increase the complexity of the RRU and more importantly make it very difficult, if not impossible, for the BS to perform MIMO beamforming computation using distributed RRUs/antennas jointly at the BS, or as phrased in [3] "Some physical-layer-coordinated technologies are difficult to be implemented".

This invention presents embodiments that use new classes of wireless active antennas or Wireless Smart Antennas (WSA) that support multi-user beamforming using distributed antennas and improve the consistency of the coverage of a MIMO BS while avoiding the high bandwidth requirements of prior art fronthaul connections and the serious shortcomings of prior art RF repeaters.

Use of centimeter and millimeter wave (all referred to as mm-wave hereafter) spectrum is a major trend in the upcoming 5G (Fifth-Generation) wireless networks. Major advantages of mm-wave include strong directivity thus low inter-beam interference, and availability of large bandwidth. Major limitations of mm-wave radio links include highly dependent on LoS conditions, wherein LoS condition is difficult to maintain between a BS or RRU(s) and UEs handled by mobile users, and difficulty serving fast moving UEs. This invention includes embodiments that make better use of the advantages of mm-wave to enhance mobile network throughput and coverage while overcoming its limitations.

BRIEF DESCRIPTION OF DRAWINGS

Abbreviations used in the following list of drawings are defined in the next section which provides the detailed description of the embodiments of the invention.

DETAILED DESCRIPTION OF PREFERRED EMBODIMENTS

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Hereafter, a pilot signal may mean a signal transmitted by one antenna for the purpose of estimating the channel between the transmitting antenna and one or more receiving antennas. It may also be called a reference signal, a channel estimation signal or a test signal.

In the following descriptions, an antenna is used to indicate a RF path that includes the RF circuits and the antenna unless indicated by the context otherwise, for example, in a hybrid beamforming system, one RF path may be connected to multiple antenna elements via a beamforming circuit, mostly analog. In such a system, all the antenna elements connected to the same RF path can be treated as a single equivalent antenna in baseband processing.

Embodiments in this invention can be incorporated with embodiments in our previous Provisional Patent Application 62/287,521 "Cellular Wireless Communication Systems Enhanced by Intelligent Self-Organizing Wireless Distributed Active Antennas" filed on Jan. 27, 2016.

Up-Convert and Down-Convert Wireless Active Antennas

One objective of this invention is to support MIMO beamforming at a BS or a BBU using distributed antennas or RRUs similar to wireless fronthaul connections between the BS and distributed antennas or RRUs in achieving distributed MIMO beamforming but without requiring significantly wider spectral resources which the prior art fronthaul connections needed for transmitting I/Q samples.

Figure 1A:
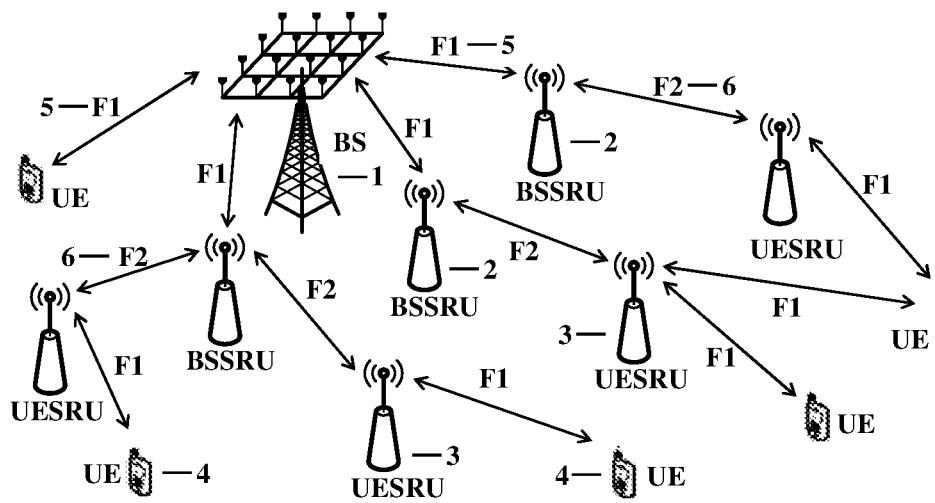
FIG. 1a shows a wireless network with a BS, BSSRUs, UESRUs, and UEs.

One embodiment is a WSA apparatus comprising a BS Side Radio Unit (BSSRU) and a UE Side Radio Unit (UESRU) wherein a BSSRU communicates with one or more BSs using a first frequency band F1 and simultaneously communicates with one or more UESRUs using a second frequency band F2, and a UESRU communicates with one or more BSSRUs using the second frequency band F2 and simultaneously communicates with one or more UEs using the first frequency band F1. In the DL direction, a BSSRU receives radio signal from one or more BSs in the F1 frequency band, shifts the radio signal to the second frequency band F2 and transmits to one or more UESRUs; and a UESRU receives radio signal from one or more BSSRUs in the F2 frequency band, shifts the radio signal to the F1 frequency band and transmits to one or more UEs. In the UL direction, a UESRU receives radio signal from one or more UEs in the F1 frequency band, shifts the radio signal to the second frequency band F2 and transmits to one or more BSSRUs; and a BSSRU receives radio signal from one or more UESRUs in the F2 frequency band, shifts the radio signal to the F1 frequency band and transmits to one or more BSs. A pair of a BSSRU and a UESRU is a split-node radio access network apparatus that revolutionizes prior art RF repeaters and avoids the shortcomings of prior art repeaters. FIG. 1a shows a wireless network with a BS 1, BSSRUs 2, UESRUs 3, and UEs 4, where the first frequency band F1 5 is employed between the BS and UEs, between the BS and BSSRUs, and between UESRUs and UEs, while the second frequency band F2 6 is employed between BSSRUs and UESRUs.

In one embodiment, the frequency band F2 is a higher frequency such as a mm-wave band, wherein a BSSRU up-shifts the radio signal that it receives from one or more BSs in F1 band to F2 band in order to transmit to one or more UESRUs and down-shifts the radio signal that it receives from one or more UESRUs in F2 band to F1 band in order to transmit to one or more BSs; and a UESRU up-shifts the radio signal that it receives from one or more UEs in F1 band to F2 band in order to transmit to one or more BSSRUs and down-shifts the radio signal that it receives from one or more BSSRUs in F2 band to F1 band in order to transmit to one or more UEs.

In another embodiment, the frequency band F2 is an optical frequency band and the wireless link between a BSSRU and a UESRU is a free-space optical link, e.g., using a laser to transmit and receive data, wherein a BSSRU uses an electrical-to-optical converter to modulate an optical beam source with the F1 band radio signal that it receives from one or more BSs in order to transmit to one or more UESRUs and uses an optical-to-electrical converter to convert the optical signal that it receives from one or more UESRUs to F1 radio frequency band in order to transmit to one or more BSs; and a UESRU uses an electrical-to-optical converter to modulate an optical beam source with the F1 band radio signal that it receives from one or more UEs in order to transmit to one or more BSSRUs and uses an optical-to-electrical converter to convert the optical signal that it receives from one or more BSSRUs to F1 radio frequency band in order to transmit to one or more UEs.

Furthermore, in a beamforming MIMO system, when a BSSRU and a UESRU have multiple antennas for spatial multiplexing to communicate using multi-streams of data between one or more BSs and one or more UEs, the BSSRU and the UESRU can maintain the spatially multiplexed multi-streams of data between a BS and UEs using frequency division multiplexing on the BSSRU and UESRU link, i.e., mapping each spatial stream of data into a separate or dedicated frequency band, thus enabling the BSSRU and the UESRU to communicate multiple streams of data using a single wide band antenna or antenna array on each side. The number of spatially beamformed data streams in a MIMO system is limited by the lowest rank of the channel matrices forming the total wireless channel matrix between the source and the destination. In the above case, when the number of separate or dedicated frequency bands equals to or exceeds, preferably equals to, the number of spatially beamformed data streams, the channel matrix between the BSSRU and the UESRU is a diagonal matrix with a rank equaling to, or exceeding, the number of spatially beamformed data streams, thus, it is capable of maintaining the number of spatially beamformed data streams between the source and the destination. In such an embodiment, each pair of a receive antenna at a BSSRU (or a UESRU) and a transmit antenna at a UESRU (or a BSSRU) goes through a different frequency channel in the BSSRU and UESRU link. Each of these channels can be estimated using reference signals and included in the estimates of the total channel between the source and destination so that proper precoding matrix can be obtained at the BS to achieve MIMO spatial multiplexing with the UEs. Alternatively, the different frequency channels between a BSSRU and a UESRU can be calibrated and compensated to be identical or approximately identical.

The embodiments using mm-wave between a BSSRU and a UESRU take advantage of the highly isolated beams due to high directivity of mm-wave and availability of wider bandwidth for the wireless link between a BSSRU and a UESRU, and use the lower frequency F1 band for communicating with UEs to avoid the difficulty of mm-wave in maintaining LoS connections with UEs and in handling UEs that are fast moving if the F2 frequency band is used to communicate with UEs.

Figure 1B:
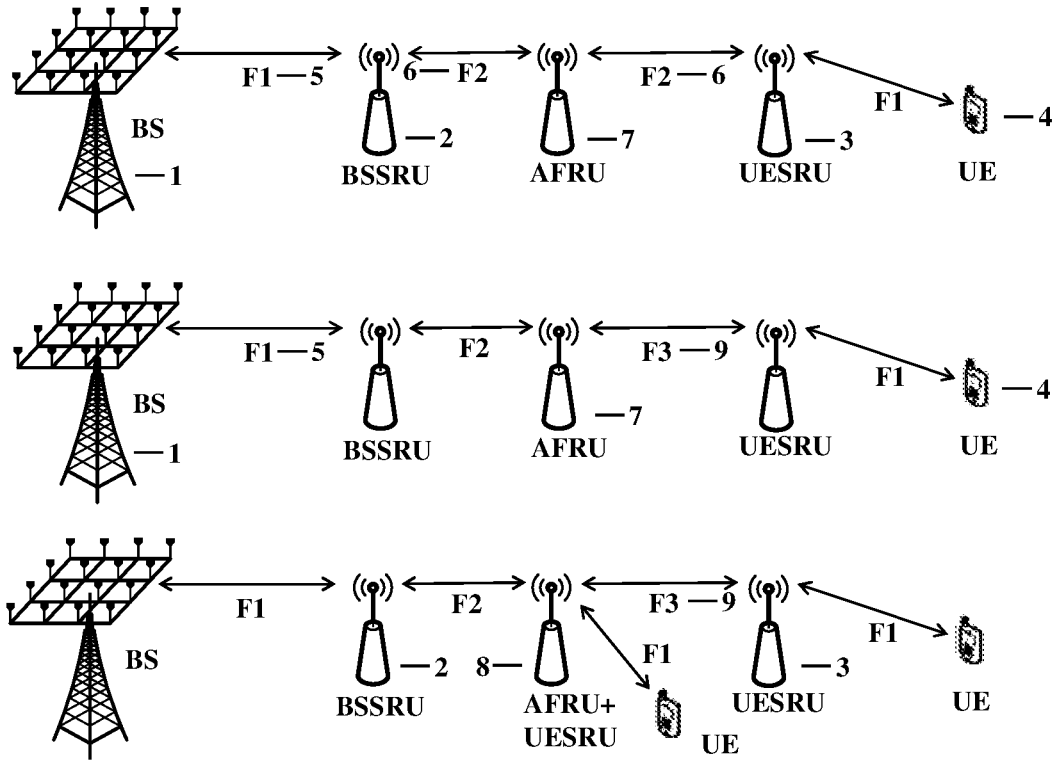
FIG. 1b shows a wireless network with a BS, a BSSRU, a UESRU, one or more UEs, and different types of AFRUs, and a node integrating the function of a UESRU and an AFRU.

The embodiment may further extend the coverage of the BS by using one or more Amplify-and-Forward Radio Units (AFRUs) that communicate with one or more BSSRUs using the second frequency band F2 and simultaneously communicate with one or more UESRUs or one or more other AFRUs also using the second frequency band F2. To avoid the interference of a Transmitter (Tx) to a Receiver (Rx) that simultaneously transmits and receives using F2, a third frequency band F3 can be used wherein a BSSRU communicates with one or more BS using a first frequency band F1 and simultaneously communicates with one or more AFRUs or UESRUs using a second frequency band F2, an AFRU communicates with one or more BSSRUs using the second frequency band F2 and simultaneously communicate with one or more UESRUs or AFRUs using a third frequency band F3, whereas each UESRU simultaneously communicates with one or more UEs using the first frequency band F1. When more than one AFRU layers are used in the link between a BS and a UESRU, in another embodiment, the AFRUs alternate the F2 and F3 bands, using F2 for Rx and F3 for Tx in a first AFRU layer, but using F3 for Rx and F2 for Tx in a second AFRU layer that communicates with the first AFRU layer. A UESRU uses the same frequency band as the AFRU(s) that it communicates with for communication with the AFRU(s) but uses F1 to communicate with one or more UEs. In the above example of two layers of AFRUs, the UESRU uses F2 to receive the signal transmitted in F2 by the second AFRU layer. In one embodiment, the same apparatus can integrate both the functions of a UESRU and an AFRU. FIG. 1b shows a wireless network with a BS 1, a BSSRU 2, a UESRU 3, one or more UEs 4, and different types of AFRUs 7, and a node integrating the function of a UESRU and an AFRU 8, where the first frequency band F1 5 is employed between the BS and the BSSRU, and between the UESRU and a UE, the second frequency band F2 6 is employed between the BSSRU and the AFRU, and optionally between the AFRU and the UESRU, while the third frequency band F3 9 is employed optionally between the AFRU and the UESRU.

The above embodiments can be used in a Time Division Duplex (TDD) or a Frequency Division Duplex (FDD) system. In a TDD system, a BSSRU, a UESRU, and an AFRU if used, receives, amplifies and forwards radio signal in one direction, e.g., DL, at one time instant, and receives, amplifies and forwards radio signal in another direction, e.g., UL, at another time instant. In a FDD system, a BSSRU, a UESRU, and an AFRU if used, receives, amplifies and forwards radio signal transmitted by a BS in the DL frequency bands $\{Fi_{DL}, i=1,2,3\}$ and simultaneously receives, amplifies and forwards radio signal transmitted by the UE(s) in the UL on paired UL frequency bands $\{Fi_{UL}, i=1,2,3\}$. In either system, an AFRU may receive, amplify and forward a radio signal using different frequency bands or using the same frequency. In the latter case, the embodiment ensures sufficient isolation between the Tx and Rx in the same frequency or uses circuits or digital signal processing to reduce the interference from the Tx to the Rx in the same frequency. Furthermore, each BSSRU, UESRU and AFRU may process the radio signal before it forwards the signal to the next hop, including filtering, equalization, and/or re-generation to improve the effective total channels between the source and destination.

Figure 2A:
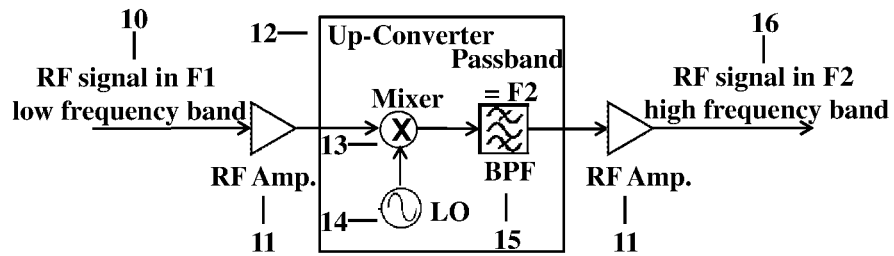
FIG. 2a shows a RF circuit path for up-shifting a RF signal in the F1 frequency band to the F2 frequency band when F2>F1.
Figure 2B:
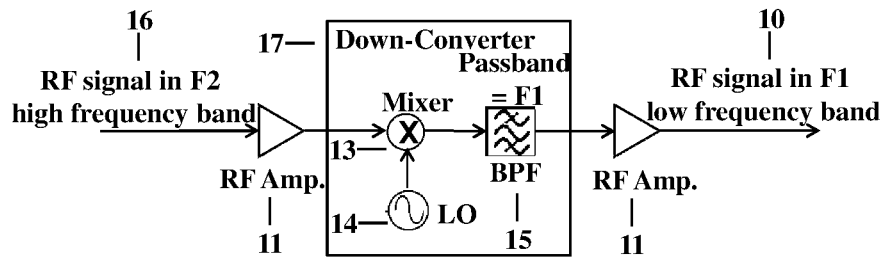
FIG. 2b shows a RF circuit path for down-shifting a RF signal in the F2 frequency band to the F1 frequency band when F2>F1.

One embodiment of a BSSRU comprises one or more Rx antennas and one or more RF paths that receive a first RF signal in the DL direction from one or more BSs in a first frequency band F1, generating a second RF signal by moving the first RF signal to a second frequency band F2, amplify it and transmit the second RF signal in the F2 band via one or more Tx antennas. The embodiment further comprises one or more Rx antennas and one or more RF paths that receive a third RF signal in the UL direction from one or more UESRUs in the second frequency band F2, generating a fourth RF signal by moving the third RF signal to the first frequency band F1, amplify it and transmit the fourth RF signal in the F1 band via one or more Tx antennas. Furthermore, in another embodiment F2>F1 and for the DL path, moving the first RF signal to a second frequency band F2 is implemented using an up-converter, wherein the up-converter further comprises a mixer, a Local Oscillator (LO), and one or more filters. FIG. 2a shows a RF circuit path for up-shifting a RF signal in the F1 frequency band to the F2 frequency band when F2>F1, where the RF signal in F1 low frequency band 10 is passed through a RF amplifier 11, through an up-converter 12 including a mixer 13, a LO 14, and a Bandpass Filter (BPF) 15 with passband F2, and through another RF amplifier 11, then it becomes a RF signal in F2 high frequency band 16. Similarly, for the UL path, moving the third RF signal to the first frequency band F1 is implemented using a down-converter, wherein the down-converter further comprises a mixer, a LO, and one or more filters. FIG. 2b shows a RF circuit path for down-shifting a RF signal in the F2 frequency band to the F1 frequency band when F2>F1, where the RF signal in F2 high frequency band 16 is passed through a RF amplifier 11, through a down-converter 17 including a mixer 13, a LO 14, and a BPF 15 with passband F1, and through another RF amplifier 11, then it becomes a RF signal in F1 low frequency band 10. In both cases, the LO is further locked or synchronized to a common reference clock with the BS. The DL and UL directions can share the same antenna(s) on each side. In a TDD network, a switch is used to switch an antenna to a Tx or Rx path using control information obtained from a BS in synchronization with the DL and UL subframes of the BS packets. Furthermore, the DL and UL RF paths can be implemented using the same circuit wherein a set of RF switches are used to connect a Rx port of the RF path to the antenna(s) on one side and the corresponding Tx port to the antenna(s) on the other side in the DL direction, and the connection is reversed in the UL direction. One advantage of such an implementation is that it can maintain the reciprocity of the over-the-air channel of a TDD network. In an FDD network, a duplexer is used to separate or combine the DL and UL signals from or to an antenna or an antenna array.

One embodiment of a UESRU comprises one or more Rx antennas and one or more RF paths that receive a fifth RF signal in the DL direction from one or more BSSRUs in the second frequency band F2, generating a sixth RF signal by moving the fifth RF signal to the first frequency band F1, amplify it and transmit the sixth RF signal in the F1 band via one or more Tx antennas to one or more UEs. The embodiment further comprises one or more Rx antennas and one or more RF paths that receive a seventh RF signal in the UL direction from one or more UEs in the first frequency band F1, generating an eighth RF signal by moving the seventh RF signal to the second frequency band F2, amplify it and transmit the eighth RF signal in the F2 band via one or more Tx antennas. Furthermore, in another embodiment F2>F1 and for the DL path, moving the fifth RF signal to the first frequency band F1 is implemented using a down-converter, wherein the down-converter further comprises a mixer, a LO, and one or more filters, as shown in FIG. 2b. Similarly, for the UL path, moving the seventh RF signal to the second frequency band F2 is implemented using an up-converter, wherein the up-converter further comprises a mixer, a LO, and one or more filters, as shown in FIG. 2a. In both cases, the LO is further locked or synchronized to a common reference clock with the BS. The DL and UL directions can share the same antenna(s) on each side. In a TDD network, a switch is used to switch an antenna to a Tx or Rx path using control information obtained from a BS in synchronization with the DL and UL subframes of the BS packets. Furthermore, the DL and UL RF paths can be implemented using the same circuit wherein a set of RF switches are used to connect a Rx port of the RF path to the antenna(s) on one side and the corresponding Tx port to the antenna(s) on the other side in the DL direction, and the connection is reversed in the UL direction. One advantage of such an implementation is that it can maintain the reciprocity of the over-the-air channel of a TDD network. In an FDD network, a duplexer is used to separate or combine the DL and UL signals from or to an antenna or an antenna array.

One embodiment of an AFRU is a full-duplex amplify-and-forward repeater comprises one or more Rx antennas and one or more RF paths that receive a RF signal in one direction, amplify it and transmit the amplified RF signal in the same frequency band via one or more Tx antennas. The Rx and Tx antennas are designed and configured so that sufficient isolation is achieved between the transmitted signal and the received signal. It may further include a self-interference cancelation function to allow a higher gain to be used in amplifying the RF signal. The self-interference cancelation function can be implemented as an adaptive RF filter, a transformation applied to the I/Q samples of the RF signal using a digital processing module, or a combination of both. The preferred embodiment is to create sufficient RF isolation between the Tx and Rx antennas so that only a digital processing module is need. Similarly, the DL and UL directions can share the same antenna(s) on each side. Furthermore, in a TDD network, the DL and UL RF paths can be implemented using the same circuit wherein a set of RF switches are used to connect a Rx port of the RF path to the antenna(s) on one side and the corresponding Tx port to the antenna(s) on the other side in the DL direction, and the connection is reversed in the UL direction.

To avoid the self-interference in a full-duplex amplify-and-forward repeater implementation, another embodiment of an AFRU comprises one or more Rx antennas and one or more RF paths that receive a ninth RF signal in one direction in the second frequency band F2, generating a tenth RF signal by moving the ninth RF signal to a third frequency band F3, amplify it and transmit the tenth RF signal in the F3 band via one or more Tx antennas. The embodiment further comprises one or more Rx antennas and one or more RF paths that receive a eleventh RF signal in the opposite direction in the third frequency band F3, generating a twelfth RF signal by moving the eleventh RF signal to the second frequency band F2, amplify it and transmit the tenth RF signal in the F2 band via one or more Tx antennas. In the above, moving a received RF signal to another frequency band is implemented by multiplying or mixing the received RF signal with a carrier signal from a LO and using a filter to select the desired frequency band. The two directions can share the same antenna(s) on each side. Furthermore, in a TDD network, the DL and UL RF paths can be implemented using the same circuit wherein a set of RF switches are used to connect a Rx port of the RF path to the antenna(s) on one side and the corresponding Tx port to the antenna(s) on the other side in the DL direction, and connection is reversed in the UL direction.

In one embodiment, a UESRU detects the presence of UEs in its coverage area using a radio signal transmitted by a UE, and goes into and stays in sleep mode when no UE is detected. In the sleep mode, it does not transmit UL signal. Upon the detection of the presence of one or more UEs, the UESRU enters into its normal working mode. A UESRU in sleep mode may further inform a BSSRU, and an AFRU if used, that it is in sleep mode, and the BSSRU, and the AFRU if used, configures its transmission accordingly. The information about the presence and absence of UEs in the UESRUs under a BS can be transmitted to the BS and the BS controls its MIMO beamforming accordingly.

In another embodiment, a BSSRU, or an AFRU if used, is equipped with steerable antennas so that it can steer the antenna beam pattern direction(s) to different UESRUs at different times. This allows a smaller number of BSSRUs to serve a larger number of UESRUs to distribute the throughput according to the distribution of UEs. It also enables a UESRU being served by a different BSSRU at different times to increase the flexibility and robustness of the radio link, e.g., to overcome a temporary blockage of a LoS path. Furthermore, multiple BSSRUs can be used to serve a single UESRU to increase the robustness and throughput of the radio link with that UESRU.

The radio or wireless link between a BS and the set(s) of the BSSRU and UESRU in the above embodiments are obviously not backhaul connections nor fronthaul connections because they are radio signals, not digital data for UEs as in backhaul connections nor digital I/Q samples as in fronthaul connections. The channel between the BS(s) and UEs that include one or more BSSRUs, one or more AFRUs if used, and one or more UESRUs functioning as described above is referred to as the Equivalent Total Channel (ETC). The embodiments above can further comprise one or more BSs estimating the ETC, and performing beamforming to communicate with the UEs with the BSSRU(s), AFRU(s) if used, and UESRU(s) functioning as described above to enhance the performance of the beamforming, wherein performing beamforming further comprises computing a precoding matrix using estimates of the ETC and applying the precoding matrix to the signals before transmitting, and/or computing a detection matrix using estimates of the ETC and applying the detection matrix to the received signals. To simplify the description, hereafter we only describe BSSRUs and UESRUs but it should be understood that one or more AFRUs can be included in the embodiments when needed.

Since both the BS(s) and UEs use the first frequency band F1 for communication, a UE may receive RF signals in the first frequency band transmitted by a BS as well as by a UESRU, and vice versa, a BS may receive RF signals in the first frequency band transmitted by one or more UEs as well as by one or more BSSRUs. A BS needs to perform MIMO beamforming considering all the signal paths in the presence of the BSSRU and UESRU to enhance the overall performance of the wireless network.

Figure 3A:
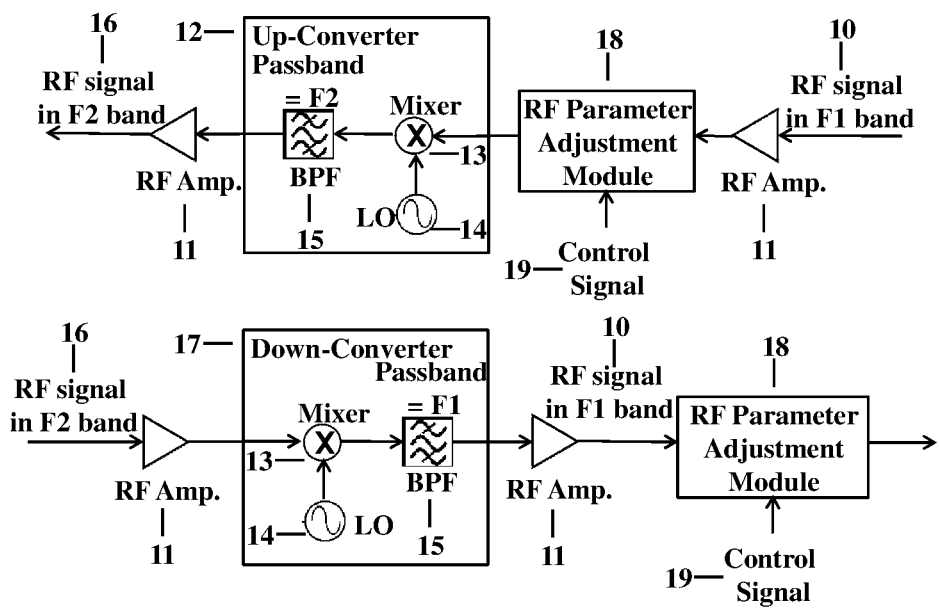
FIG. 3a shows a circuit for calibrating the DL and UL RF circuits of a BSSRU, a UESRU, a UEWSA, and an AFRU if used, to have the same transfer function.
Figure 3B:
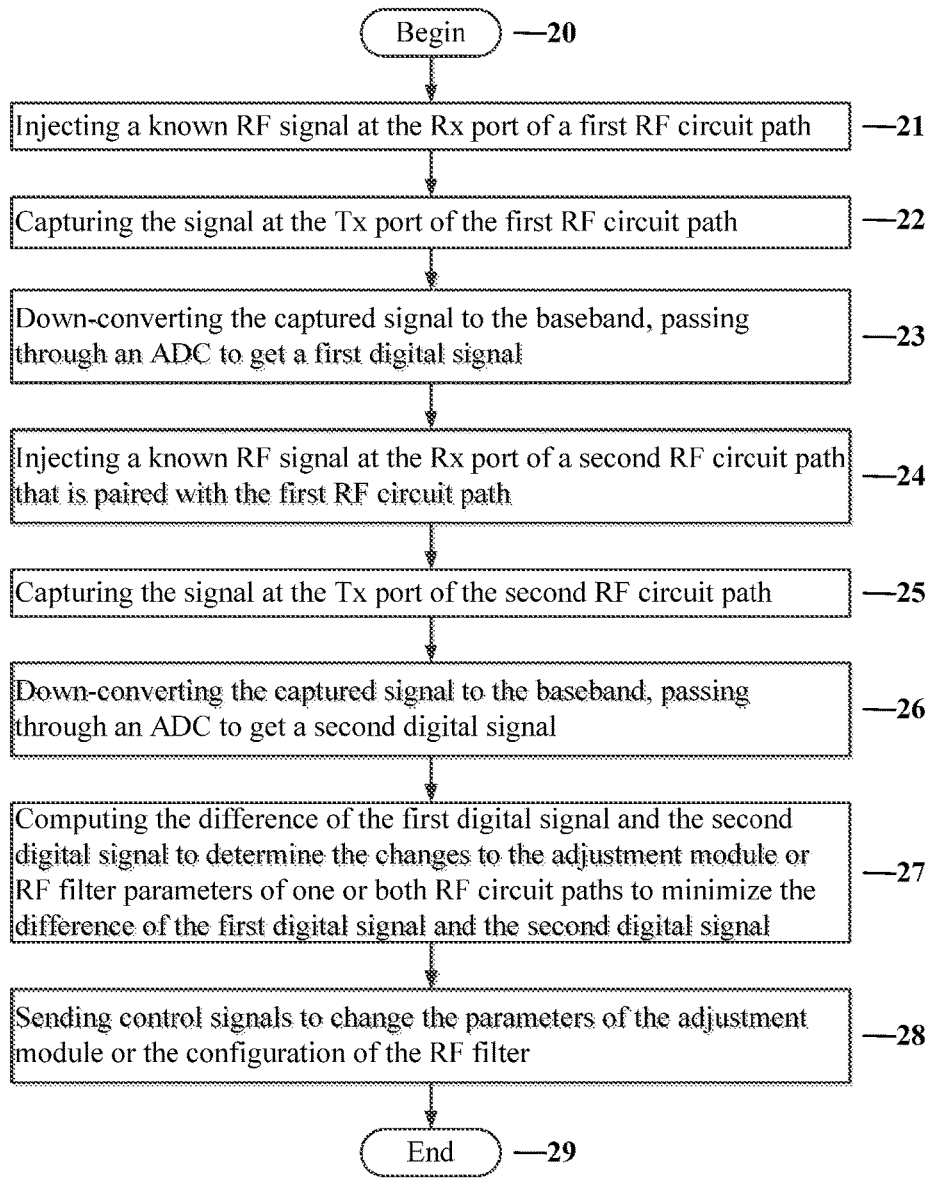
FIG. 3b shows the corresponding calibration procedure.

In a massive MIMO system, if the ETC between the BS(s) and UEs that includes the over-the-air channel and any units that affect the radio waves in between is reciprocal for the DL and UL, the channel in one direction can be estimated by transmitting pilot signals in that direction, and the channel for the other direction can be computed. For example, in a TDD system, the UL channel can be estimated by having UEs sending UL sounding signals in one frequency band, and a BS can compute an estimate of the DL channel in that frequency band using the UL channel estimates and the parameters of RF circuits in the BS, which can be obtained through a calibration procedure. Hence, maintaining the reciprocity of the ETC offers advantages in massive MIMO. In one embodiment, the BSSRU and the UESRU are designed such that their DL and UL RF circuits are symmetric so that they maintain the reciprocity of the total channel. In one embodiment, the DL and UL RF circuits of each BSSRU and UESRU are calibrated to have the same transfer function, within a tolerance, by adjusting the parameters of either one or both of the RF circuits. Adjustment of the parameters of the RF circuits can be implemented by including an adjustment module in the circuit of a RF path. FIG. 3a shows a circuit for calibrating the DL and UL RF circuits of a BSSRU, a UESRU, a UEWSA, and an AFRU if used, to have the same transfer function, where a RF parameter adjustment module 18 that is controlled by a control signal 19 can be added between the first RF amplifier and the up-converter for a RF circuit path that up-shifts a RF signal in the F1 frequency band to the F2 frequency band when F2>F1 as shown in FIG. 2a, and/or after the second RF amplifier for a RF circuit path that down-shifts a RF signal in the F2 frequency band to the F1 frequency band when F2>F1 as shown in FIG. 2b. To reduce the circuit complexity and/or cost, the adjustment module is placed in the low frequency side of the circuit both in the low frequency to high frequency shifting circuit path and in the high frequency to low frequency shifting circuit path. As an example, F1 is the low frequency band under 6 GHz, and F2 is the high frequency mm-wave band. In one embodiment, the adjustment module is a configurable RF filter and the configuration of the RF filter is adjusted based on the results of a calibration procedure. In another embodiment, the adjustment module comprises one or more sets of an adjustable phase shifter, an adjustable delay component, and an adjustable gain block, and the configuration of these components are adjusted based on the results of a calibration procedure. One calibration procedure is shown in FIG. 3b, which comprises that after the process begins 20, injecting a known RF signal at the Rx port of a first RF circuit path 21 of a BSSRU, a UESRU, or an AFRU if used, capturing the signal at the Tx port of the first RF circuit path 22, down-converting the captured signal to the baseband, passing through an Analog-to-Digital Converter (ADC) to get a first digital signal 23; injecting a known RF signal at the Rx port of a second RF circuit path that is paired with the first RF circuit path 24 of the BSSRU, the UESRU, or the AFRU, capturing the signal at the Tx port of the second RF circuit path 25, down-converting the captured signal to the baseband, passing through an ADC to get a second digital signal 26; computing the difference of the first digital signal and the second digital signal to determine the changes to the adjustment module or the RF filter parameters, e.g., delay, phase shift and gain, of one or both RF circuit paths to minimize the difference of the first digital signal and the second digital signal 27, and sending control signals to change the parameters of the adjustment module or the configuration of the RF filter 28, before the process ends 29. The time interval between the adjustments of the RF circuit path parameters is determined by the coherence time of the RF circuit path.

The embodiments using the BSSRU, the UESRU, and the AFRU if used, can be applied for capacity projection, i.e., projecting strong BS signals to poor coverage areas, to improve consistency of coverage and user experience in cell edge and poor coverage spots. We have shown with simulation and measurements that these embodiments do not only improve spectral efficiency of UEs at cell edge and poor coverage areas, but also simultaneously improve average spectral efficiency and total throughput. We have also shown that embodiments improve load balancing between neighboring cells, leading to substantial improvement of total network performance by improving scheduling fairness and utilization of under-utilized radio resource. We found that directional and narrow beamwidth antenna is better for improving cell edge performance, while omni-directional and wide beamwidth antenna is better for improving average UE spectral efficiency. One embodiment includes multiple antennas or antenna patterns on a UESRU and adaptively selecting the antenna or antenna pattern that delivers more performance gain. Antenna pattern selection also includes using beam switching or beam steering antenna and selecting the desired beam or beam steering direction.

Millimeter-Wave-Hauled Wireless Active Antennas

Instead of using WSAs comprising the BSSRU and the UESRU, the above embodiments can be modified to use UE-serving WSAs (UEWSAs) each of which is a UESRU, thus doing away with the BSSRU, wherein a UEWSA serves UEs using frequency band F1 and communicates directly with BS(s) using frequency band F2. The modified embodiments support MIMO beamforming at a BS or a BBU using distributed UEWSAs to communicate with UEs via RF links between the BS or the BBU and the UEWSAs without requiring significantly wider spectral resource as needed for transmitting I/Q samples. In the embodiments in this section, the BS uses a frequency in the F2 band as carrier but beamforms or MU-MIMO spatial multiplexes with UEs which use a frequency in the F1 band as carrier.

Figure 4A:
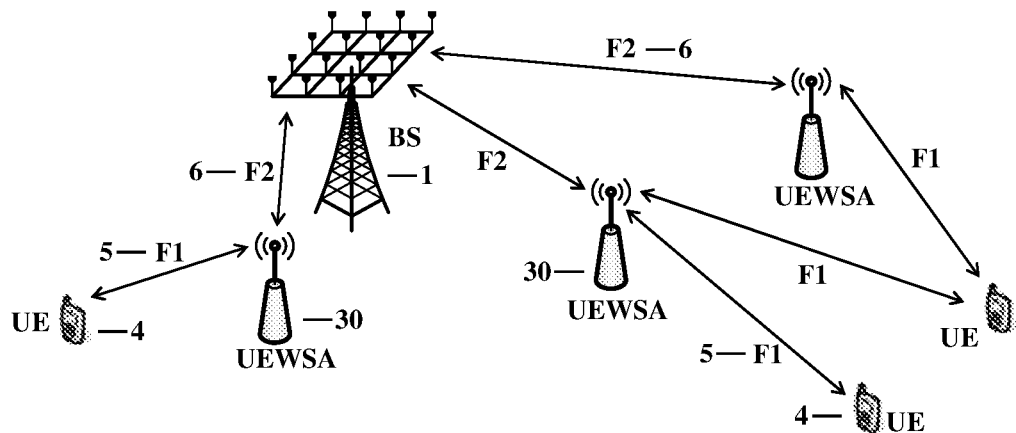
FIG. 4a shows a wireless network with a BS, UEWSAs, and UEs.

A UEWSA comprises a RRU that communicates with one or more BSs using a second frequency band F2 and simultaneously communicates with one or more UEs using a first frequency band F1. In the DL direction, a UEWSA receives radio signal from one or more BSs in the F2 frequency band, shifts the radio signal to the first frequency band F2 and transmits the signal to one or more UEs; In the UL direction, a UEWSA receives radio signal from one or more UEs in the F1 frequency band, shifts the radio signal to the second frequency band F2 and transmits to one or more BSs. FIG. 4a shows a wireless network with a BS 1, UEWSAs 30, and UEs 4, where the first frequency band F1 5 is employed between UEWSAs and UEs, while the second frequency band F2 6 is employed between the BS and UEWSAs. In one embodiment, the frequency band F2 is a higher frequency such as a mm-wave band, wherein a UEWSA up-shifts the radio signal that it receives from one or more UEs in F1 band to F2 band in order to transmit to one or more BSs and down-shifts the radio signal that it receives from one or more BSs in F2 band to F1 band in order to transmit to one or more UEs. In another embodiment, the frequency band F2 is an optical frequency and the wireless link between a BS and a UEWSA is a free-space optical link, wherein a UEWSA uses an electrical-to-optical converter to modulate an optical beam source with the F1 band radio signal that it receives from one or more UEs in order to transmit to one or more BSs over a free-space optical link and uses an optical-to-electrical converter to convert the optical signal that it receives from one or more BSs over a free-space optical link to the F1 radio frequency band in order to transmit to one or more UEs.

Furthermore, in a beamforming MIMO system, when a BS and a UEWSA have multiple antennas for spatial multiplexing to communicate using multi-streams of data between one or more BSs and one or more UEs, the BS and UEWSA can achieve spatial multiplexing and maintain the multi-streams of data using frequency division multiplexing, i.e., mapping each spatial stream of data into a separate or dedicated frequency band, thus enabling the BS and UEWSA to communicate multiple streams of data using a single wide band antenna or antenna array on each side. The number of spatially beamformed data streams in a MIMO system is limited by the lowest rank of the channel matrices forming the total wireless channel matrix between the source and the destination. In the above case, when the number of separate or dedicated frequency bands equals to or exceeds, preferably equals to, the number of spatially beamformed data streams, the channel matrix between the BS and UEWSA is a diagonal matrix with a rank equaling to, or exceeding, the number of spatially beamformed data streams, thus, it is capable of maintaining the number of spatially beamformed data streams between the source and the destination. In such an embodiment, each pair of a transmit antenna at a BS (or a UEWSA) and a receive antenna at a UEWSA (or a BS) goes through a different frequency channel in the BS and UEWSA link. Each of these channels is included in the estimates of the ETC between the source and destination, thus a precoding matrix can be obtained at the BS to achieve MIMO spatial multiplexing with the UEs. Alternatively, the different frequency channels between the BS and UEWSA can be calibrated and compensated to be identical or approximately identical.

The embodiments using mm-wave between a BS and a UEWSA take advantage of the highly isolated beams due to high directivity of mm-wave and availability of wider bandwidth for the wireless link between a BS and a UEWSA, and use the lower frequency F1 band for communicating with UEs to avoid the difficulty of mm-wave in maintaining LoS connections with UEs and in handling UEs that are fast moving if the F2 frequency band is used to communicate with UEs.

Figure 4B:
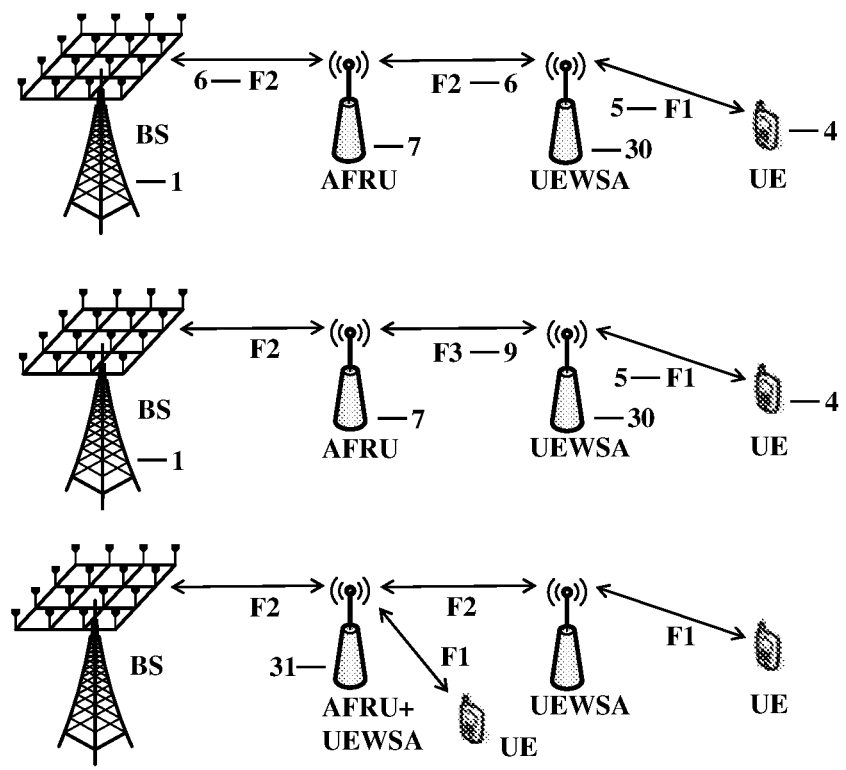
FIG. 4b shows a wireless network with a BS, a UEWSA, one or more UEs, and different types of AFRUs, and a node integrating the function of a UEWSA and an AFRU.

The embodiment may further extend the coverage of the BS by using one or more AFRUs that communicate with one or more BSs using the second frequency band F2 and simultaneously communicates with one or more UEWSAs or one or more AFRUs also using the second frequency band F2. To avoid the interference of a Tx to a Rx that simultaneously transmits and receives using F2, a third frequency band F3 can be used wherein one or more AFRU communicates with one or more BS using the second frequency band F2 and simultaneously communicates with one or more UEWSAs or AFRUs using a third frequency band F3, whereas the UEWSAs simultaneously communicate with one or more UEs using the first frequency band FL When more than one AFRU layers are used in the link between a BS and a UEWSA, in another embodiment, the AFRUs alternate the F2 and F3 bands, using F2 for Rx and F3 for Tx in a first AFRU layer, but using F3 for Rx and F2 for Tx in a second AFRU layer that communicates with the first AFRU layer. The UEWSA uses the same frequency band as the AFRU(s) it communicates with for communication with the AFRU(s) but uses F1 to communicate with one or more UEs. In the above example of two layers of AFRUs, the UEWSA uses F2 to receive the signal transmitted in F2 by the second AFRU layer. In one embodiment, the same apparatus can integrate both the functions of a UEWSA and an AFRU. FIG. 4b shows a wireless network with a BS 1, a UEWSA 30, one or more UEs 4, and different types of AFRUs 7, and a node integrating the function of a UEWSA and an AFRU 31, where the first frequency band F1 5 is employed between the UEWSA and a UE, the second frequency band F2 6 is employed between the BS and the AFRU, and optionally between the AFRU and the UEWSA, while the third frequency band F3 9 is employed optionally between the AFRU and the UEWSA.

The above embodiments can be used in a TDD or a FDD system. In a TDD system, a UEWSA, and an AFRU if used, receives, amplifies and forwards radio signal in one direction, e.g., DL, at one time instant, and receives, amplifies and forwards radio signal in another direction, e.g., UL, at another time instant. In a FDD system, a UEWSA, and an AFRU if used, receives, amplifies and forwards radio signal transmitted by a BS in the DL frequency bands $\{Fi_{DL}, i=1,2,3\}$ and simultaneously receives, amplifies and forwards radio signal transmitted by the UE(s) in the UL on paired UL frequency bands $\{Fi_{UL}, i=1,2,3\}$. In either system, an AFRU may receive, amplify and forward a radio signal using different frequency bands or using the same frequency. In the latter case, the embodiment ensures sufficient isolation between the Tx and Rx in the same frequency or uses circuits or digital signal processing to reduce the interference from the Tx to the Rx in the same frequency. Furthermore, each UEWSA and AFRU may process the radio signal before it forwards the signal to the next hop, including filtering, equalization, and/or re-generation to improve the effective total channels between the source and destination.

One embodiment of a UEWSA comprises one or more Rx antennas and one or more RF paths that receive a first RF signal in the DL direction from one or more BSs in the second frequency band F2, generating a second RF signal by moving the first RF signal to the first frequency band F1, amplify it and transmit the second RF signal in the F1 band via one or more Tx antennas. The embodiment further comprises one or more Rx antennas and one or more RF paths that receive a third RF signal in the UL direction from one or more UEs in the first frequency band F1, generating a fourth RF signal by moving the third RF signal to the second frequency band F2, amplify it and transmit the fourth RF signal in the F2 band via one or more Tx antennas. Furthermore, in another embodiment F2>F1 and for the DL path, moving the first RF signal to the first frequency band F1 is implemented using a down-converter, wherein the down-converter further comprises a mixer, a LO, and one or more filters, as shown in FIG. 2b. Similarly, for the UL path, moving the third RF signal to the second frequency band F2 is implemented using an up-converter, wherein the up-converter further comprises a mixer, a LO, and one or more filters, as shown in FIG. 2a. In both cases, the LO is further locked or synchronized to a common reference clock with the BS. The DL and UL directions can share the same antenna(s) on each side. In a TDD network, a switch is used to switch an antenna to a Tx or Rx path using control information obtained from a BS in synchronization with the DL and UL subframes of the BS packets. Furthermore, the DL and UL RF paths can be implemented using the same circuit wherein a set of RF switches are used to connect a Rx port of the RF path to the antenna(s) on one side and the corresponding Tx port to the antenna(s) on the other side in the DL direction, and the connection is reversed in the UL direction. One advantage of such an implementation is that it can maintain the reciprocity of the over-the-air channel of a TDD network. In an FDD network, a duplexer is used to separate or combine the DL and UL signals from or to an antenna or an antenna array.

One embodiment of an AFRU is a full-duplex amplify-and-forward repeater comprises one or more Rx antennas and one or more RF paths that receive a RF signal in one direction, amplify it and transmit the amplified RF signal in the same frequency band via one or more Tx antennas. The Rx and Tx antennas are designed and configured so that sufficient isolation is achieved between the transmitted signal and the received signal. It may further include a self-interference cancelation function to allow a higher gain to be used in amplifying the RF signal. The self-interference cancelation function can be implemented as an adaptive RF filter, a transformation applied to the I/Q samples of the RF signal using a digital processing module, or a combination of both. The preferred embodiment is to create sufficient RF isolation between the Tx and Rx antennas so that only a digital processing module is need. Similarly, the DL and UL directions can share the same antenna(s) on each side. Furthermore, in a TDD network, the DL and UL RF paths can be implemented using the same circuit wherein a set of RF switches are used to connect a Rx port of the RF path to the antenna(s) on one side and the corresponding Tx port to the antenna(s) on the other side in the DL direction, and the connection is reversed in the UL direction.

To avoid the self-interference in a full-duplex amplify-and-forward repeater implementation, another embodiment of an AFRU comprises one or more Rx antennas and one or more RF paths that receive a RF signal in one direction in the second frequency band F2, generating another RF signal by moving the received RF signal to a third frequency band F3, amplify it and transmit the generated RF signal in the F3 band via one or more Tx antennas. The embodiment further comprises one or more Rx antennas and one or more RF paths that receive a RF signal in the opposite direction in the third frequency band F3, generating another RF signal by moving the received RF signal to the second frequency band F2, amplify it and transmit the generated RF signal in the F2 band via one or more Tx antennas. In the above, moving a received RF signal to another frequency band is implemented by multiplying or mixing the received RF signal with a carrier signal from a LO and using a filter to select the desired frequency band. The two directions can share the same antenna(s) on each side. Furthermore, in a TDD network, the DL and UL RF paths can be implemented using the same circuit wherein a set of RF switches are used to connect a Rx port of the RF path to the antenna(s) on one side and the corresponding Tx port to the antenna(s) on the other side in the DL direction, and the connection is reversed in the UL direction.

In one embodiment, a UEWSA detects the presence of UEs in its coverage area using a radio signal transmitted by a UE, and goes into and stay in sleep mode when no UE is detected. In the sleep mode, it does not transmit UL signal. Upon the detection of the presence of one or more UEs, the UEWSA enters into its normal working mode. A UEWSA in sleep mode may further inform a BS, and an AFRU if used, that it is in sleep mode, and the BS, and the AFRU if used, configures its transmission accordingly. The information about the presence and absence of UEs in the UEWSAs under a BS can be transmitted to the BS and the BS controls its MIMO beamforming accordingly.

In another embodiment, a BS, or an AFRU if used, is equipped with steerable antennas so that it can steer the antenna beam pattern direction(s) to different UEWSAs at different times. This allows a BS to serve a larger number of UESWAs to distribute the throughput according to the distribution of UEs. It also enables a UEWSA being served by a different BS at different times to increase the flexibility and robustness of the radio link, e.g., to overcome a temporary blockage of a LoS path. Furthermore, multiple BSs can be used to serve a single UEWSA to increase the robustness and throughput of the radio link with that UEWSA.

A BS communicates in the second frequency band F2 with spatially distributed UEWSAs, and UE(s) communicate in the first frequency band with one or more UEWSAs. In one embodiment, the BS performs MIMO beamforming with multiple UEWSAs to communicate with them using the same time and frequency resources in the F2 frequency band, and performs MIMO beamforming with multiple UEs to communicate with them using the same time and frequency resources in the F1 frequency band.

The radio or wireless link between a BS and the UEWSAs in the above embodiments are obviously not backhaul connections nor fronthaul connections because they are radio signals, not digital data for UEs as in backhaul connections nor digital I/Q samples as in fronthaul connections. The channel between the BS(s) and UEs that include one or more UEWSAs, and AFRUs if used, functioning as described above is referred to as the ETC. A BS needs to estimate the channels with the UEWSAs to perform beamforming with them in the F2 frequency band, and needs to estimate the ETC with the UEs to perform beamforming with them over the ETC that includes both the F1 and F2 frequency bands.

The embodiments above can further comprise one or more BSs estimating the ETC, and performing beamforming to communicate with the UEs with the UEWSAs, and AFRUs if used, functioning as described above, wherein performing beamforming further comprises computing a precoding matrix using estimates of the ETC and applying the precoding matrix to the signals before transmitting, and/or computing a detection matrix using estimates of the ETC and applying the detection matrix to the received signals. To simplify the description, hereafter we only describe BSs and UEWSAs but it should be understood that one or more AFRUs can be included in the embodiments when needed.

One embodiment maintains the reciprocity of the ETC to enable estimating the DL ETC using UL sounding by UEs, wherein UEWSAs are designed such that their DL and UL RF circuits are symmetric so that they maintain the reciprocity of the ETC. In one embodiment, the DL and UL RF circuits of each UEWSA is calibrated to have the same transfer function, within a tolerance, by adjusting the parameters of either one or both of the RF circuits. Adjustment of the parameters of the RF circuits can be implemented by including an adjustment module in the circuit of a RF path, as shown in FIG. 3a. To reduce the circuit complexity and/or cost, the adjustment module is placed in the F1 low frequency side of the circuit both in the F1 to F2 shifting circuit path to shift F1 band to the F2 mm-wave band, and in the F2 to F1 shifting circuit path to shift the F2 mm-wave band to the lower F1 band. In one embodiment, the adjustment module is a configurable RF filter and the configuration of the RF filter is adjusted based on the results of a calibration procedure. In another embodiment, the adjustment module comprises one or more sets of an adjustable phase shifter, an adjustable delay component, and an adjustable gain block, and the configuration of these components are adjusted based on the results of a calibration procedure. One calibration procedure shown in FIG. 3b comprises injecting a known RF signal at the Rx port of a first RF circuit path of a UEWSA, or an AFRU if used, capturing the signal at the Tx port of the first RF circuit path, down-converting the captured signal to the baseband, passing through an ADC to get a first digital signal; injecting a known RF signal at the Rx port of a second RF circuit path that is paired with the first RF circuit path of the UEWSA or the AFRU, capturing the signal at the Tx port of the second RF circuit path, down-converting the captured signal to the baseband, passing through an ADC to get a second digital signal; computing the difference of the first digital signal and the second digital signal to determine the changes to the adjustment module or the RF filter parameters, e.g., delay, phase shift and gain, of one or both RF circuit paths to minimize the difference of the first digital signal and the second digital signal, and sending control signals to change the parameters of the adjustment module or the configuration of the RF filter. The interval between the adjustments of the RF circuit path parameters is determined by the coherence time of the RF circuit path.

The embodiments using the UEWSAs, and the AFRU if used, can provide significantly more consistent coverage and user experience than prior art networks, improve cell edge or worst 5% user experience, and at the same time increase total throughput of the network. They can also effectively balance load between neighboring cells. One embodiment includes multiple antennas or antenna patterns on a WSA and adaptively selecting the antenna or antenna pattern that delivers more performance gain. Antenna pattern selection also includes using beam switching or beam steering antenna and selecting the desired beam or beam steering direction.

Phase Noise in Up-Conversion or Down-Conversion

When shifting radio signal between two frequency bands that are widely apart, e.g., shifting a RF signal in a mm-wave band to a sub-6 GHz band, the jitter or phase noise in the higher frequency band can exceed the requirement in the lower frequency band. In one embodiment using Orthogonal Frequency Division Multiplexing (OFDM), an appropriate subcarrier width is chosen to accommodate the additional phase noise introduced by the frequency shifting of the BSSRU, the UESRU or the UEWSA, and the AFRU if used, by balancing the decrease in spectral efficiency due to wider subcarrier width and the total network performance gain due to better coverage and spatial multiplexing achieved.

In one embodiment, to combat the additional phase noise introduced by the frequency shifting, a BSSRU, a UESRU or a UEWSA, and an AFRU if used, includes a module for shortening or broadening of the radio signal in the time domain before it is transmitted, wherein shortening a radio signal in the time domain corresponds to widening the spectrum of the signal in the frequency domain, and broadening a radio signal in the time domain corresponds to narrowing the spectrum of the signal in the frequency domain. Time domain broadening can be used for shifting a higher F2 frequency band radio signal which has a wider subcarrier width, thus a shorter time domain pulse, to a lower F1 frequency band radio signal which has a narrower subcarrier width, thus a longer time domain pulse. Conversely, time domain shortening can be used for shifting a lower F1 frequency band radio signal which has a narrower subcarrier width, thus a longer time domain pulse, to a higher F2 frequency band radio signal which has a wider subcarrier width, thus a shorter time domain pulse.

Figure 5:
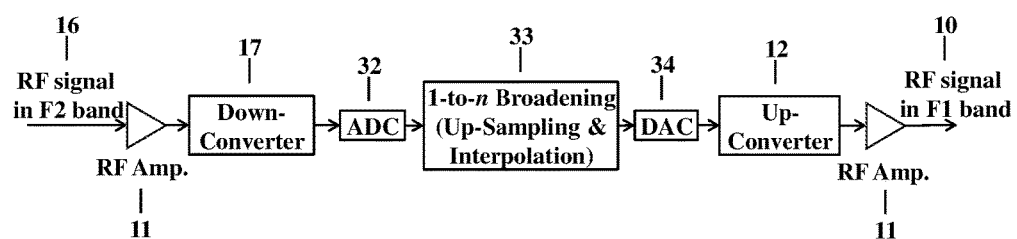
FIG. 5 shows the circuit for time-domain broadening of a wider bandwidth signal in the higher F2 frequency band to produce a narrower bandwidth signal in the lower F1 frequency band.

In one embodiment for an 1-to-n broadening of a first radio signal in the time domain, as shown in FIG. 5, the received first radio signal in the receive higher F2 frequency band 16 is first passed through a RF amplifier 11 then down-converted by a down-converter 17 and sampled using an ADC 32 to produce the received digital samples, which are up-sampled, e.g., n−1 digital samples are interpolated between two digital samples of the received signal using an interpolation filter, by a 1-to-n broadening module 33 to generate a new digital signal, then the new digital samples are fed into a Digital-to-Analog Converter (DAC) 34 whose output is up-converted by an up-converter 12 and amplified by another RF amplifier 11 to generate a second radio signal which is filtered to produce a narrower bandwidth signal in the transmit lower F1 frequency band 10 to be send. Because it takes a longer time to transmit the interpolated digital samples than to receive the first radio signal to be broadened, the source node transmitting the first radio signal needs to transmit radio signal pulses in intervals so that the node performing the time domain broadening can have time to complete the broadening of pulses without causing overflow of the local buffer. The latency of a BSSRU, a UESRU or a UEWSA, and an AFRU if used, performing the time domain broadening can be as low as one digital sampling interval in the ADC of the first radio signal plus the circuit path delay.

Figure 6:
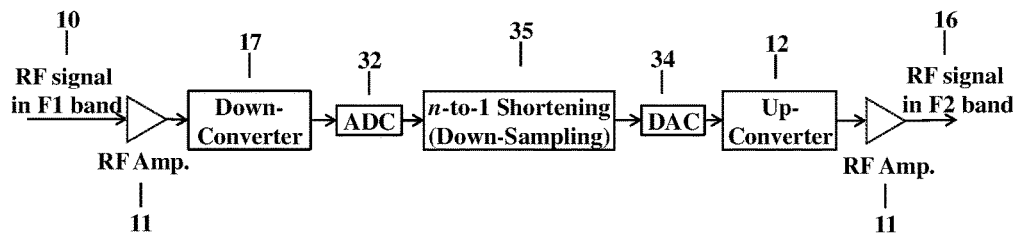
FIG. 6 shows the circuit for time-domain shortening of a narrower bandwidth signal in the lower F1 frequency band to produce a wider bandwidth signal in the higher F2 frequency band.

In the other direction of n-to-1 shortening of a first radio signal in the time domain, as shown in FIG. 6, the received first radio signal in the receive lower F1 frequency band 10 is first passed through a RF amplifier 11 then down-converted by a down-converter 17 and sampled using an ADC 32 to produce the received digital samples, which are down-sampled, e.g., n digital samples of the received signal are weighted by a windowing function to generate one new digital sample, by a n-to-1 shortening module 35 to generate a new digital signal, then the new digital samples are fed into a DAC 34 whose output is up-converted by an up-converter 12 and amplified by another RF amplifier 11 to generate a second radio signal which is filtered to produce a wider bandwidth signal in the transmit higher F2 frequency band 16 to be send. For proper time domain shortening, all samples or nearly all samples of one symbol or one pulse, or one easily delineated time slot, need to be received before the shortened radio signal is generated and transmitted. As a result, the latency of a BSSRU, a UESRU or a UEWSA, and an AFRU if used, performing the time domain shortening can be as high as one symbol or one pulse, or one easily delineated time slot.

In another embodiment, a BSSRU, a UESRU or a UEWSA, and an AFRU if used, includes a module for channel equalization, frequency offset compensation, and/or time offset compensation, that equalizes or compensates the previous wireless channel before it transmits the signal over the next wireless channel.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

REFERENCES

[1]. Neeraj Choubey et al. (2016) Introducing Facebook's new terrestrial connectivity systems —Terragraph and Project ARIES. [Online]. Available: https://code.facebook.com/posts/1072680049445290/introducing-facebook-s-new-terrestrial-connectivity-systems-terragraph-and-project-aries/

[2]. Antonio Forenza et al. (2016) Achieving Large Multiplexing Gain in Distributed Antenna Systems via Cooperation with pCell Technology. arXiv:1601.06209. [Online]. Available: http://arxiv.org

[3]. Chih-Lin I et al., "NGFI, the xHaul", in Proc. 2015 *IEEE Globecom Workshops*, San Diego, Calif., USA, December 2015.

[4]. Antonio de la Oliva et al., "XHaul: Toward an Integrated Fronthaul/Backhaul Architecture in 5G Networks", *IEEE Wireless Communications*, vol. 22, no. 5, pp. 32-40, October 2015.

We claim:

1. Wireless Smart Antenna apparatus comprising a Base Station Side Radio Unit (BSSRU) and one or more User Equipment Side Radio Units (UESRUs), wherein if the BSSRU is distributed in a coverage area of a Base Station (BS), the BSSRU communicates with the BS using a first frequency band F1 and simultaneously communicates with a plural of UESRUs selected from said one or more UESRUs using a second frequency band F2, OR wherein if the BSSRU is integrated into a BS, the BSSRU communicates with the BS baseband through circuits and communicates with a plural of UESRUs selected from said one or more UESRUs in the second frequency band F2 using Multi-User Multiple Input Multiple Output (MU-MIMO) spatial multiplexing, wherein a UESRU selected from said one or more UESRUs communicates with one or more distributed OR integrated BSSRUs using the second frequency band F2 and simultaneously communicates with one or more User Equipment (UEs) using the first frequency band F1, and wherein a UESRU selected from said one or more UESRUs with a plural of radio transmitting and receiving paths and antennas, or a plural of UESRUs selected from said one or more UESRUs collectively, simultaneously communicate in the F1 frequency band with a plural of UEs distributed over the coverage area of the UESRU or the plural of UESRUs using MU-MIMO spatial multiplexing.

2. The Wireless Smart Antenna apparatus in claim 1 wherein when a BSSRU and a UESRU each has multiple antennas for spatial multiplexing to communicate multi-streams of data between a BS and one or more UEs, the BSSRU and the UESRU maintain the spatially multiplexed multi-streams of data between the BSSRU and UEs using frequency division multiplexing on the BSSRU and UESRU link by mapping spatial streams of data into frequency bands to enable the BSSRU and the UESRU to communicate multiple streams of data using a single wide band antenna or antenna array on each side, wherein a number of frequency bands equals to or exceeds a number of spatially beam-formed data streams.

3. The Wireless Smart Antenna apparatus in claim 1 wherein a distributed BSSRU and/or a UESRU receives a first radio signal in one frequency band, generates a second radio signal by moving the first radio signal to another frequency band, amplifies and transmits the second radio signal.

4. The Wireless Smart Antenna apparatus in claim 3 wherein the distributed BSSRU and/or UESRU further processes a waveform of the first radio signal, generates the second radio signal with a waveform that is shorter or longer in time than the waveform of the first radio signal.

5. The Wireless Smart Antenna apparatus in claim 1 further comprises one or more Amplify-and-Forward Radio Units (AFRUs) that communicate with one or more BSSRUs using the second frequency band F2 and simultaneously communicate with one or more UESRUs or one or more other AFRUs also using the second frequency band F2.

6. The Wireless Smart Antenna apparatus in claim 5 further comprises a self-interference cancelation function to allow a higher gain to be used in amplifying a RF signal.

7. The Wireless Smart Antenna apparatus in claim 1 further comprises one or more Amplify-and-Forward Radio Units (AFRUs) that communicate with one or more BSSRUs using the second frequency band F2 and simultaneously communicate with one or more UESRUs or AFRUs using a third frequency band F3, wherein the UESRU communicates with the AFRU using the third frequency band F3 and simultaneously communicates with one or more UEs using the first frequency band F1.

8. The Wireless Smart Antenna apparatus in claim 7 further comprises more than one AFRU layers in a link between the BS and the UESRU and the AFRUs alternate the F2 and F3 bands for transmission and receiving to avoid interference.

9. The Wireless Smart Antenna apparatus in claim 1 wherein a distributed BSSRU and/or UESRU processes a received radio signal before it re-transmits the signal to a next receiver, wherein processing includes one or more of equalization, frequency offset compensation, time offset compensation, phase noise reduction, and/or re-generation to improve an effective total channels between a source and destination.

10. The Wireless Smart Antenna apparatus in claim 1 wherein the UESRU detects a presence of UE(s) in its coverage area, and goes into and stays in sleep mode when no UE is detected; and upon the detection of the presence of one or more UEs, enters into its normal working mode.

11. The Wireless Smart Antenna apparatus in claim 10 wherein the UESRU does not transmit uplink signals when it is in sleep mode.

12. The Wireless Smart Antenna apparatus in claim 10 wherein the UESRU in sleep mode informs the BSSRU that it is in sleep mode, and the BSSRU configures its transmission accordingly.

13. The Wireless Smart Antenna apparatus in claim 1 wherein the UESRU detects a presence of UE(s) in its coverage area and transmits an information about the presence and absence of UEs in the coverage area of the UESRUs under the distributed BSSRU or the BS to the distributed BSSRU or BS and the BSSRU or BS controls its MIMO beamforming accordingly.

14. The Wireless Smart Antenna apparatus in claim 1 wherein the BSSRU, or the AFRU if present, and/or UESRU is equipped with one or more antenna arrays which generate steerable beam patterns so that it can steer the beam pattern direction(s) to different receivers at different times.

15. The Wireless Smart Antenna apparatus in claim 1 wherein the BSSRU(s), AFRUs if present, and UESRU(s) maintain a downlink and uplink reciprocity of an over-the-air channel of an Equivalent Total Channel (ETC).

16. The Wireless Smart Antenna apparatus in claim 1 wherein the UESRU further comprises multiple antennas or antenna patterns, wherein the antenna or antenna pattern is adaptively selected to deliver higher performance gain.

17. The Wireless Smart Antenna apparatus in claim 1 wherein the frequency band F2 is an optical frequency band and the wireless link between the BSSRU and the UESRU is a free-space optical link, wherein the distributed BSSRU uses an electrical-to-optical converter to modulate an optical beam source with the signal that it receives from the BS in order to transmit to one or more UESRUs and uses an optical-to-electrical converter to convert the optical signal that it receives from one or more UESRUs to electrical signals in order to transmit to the BS; and the UESRU uses the electrical-to-optical converter to modulate an optical beam source with the F1 band radio signal that it receives from one or more UEs in order to transmit to one or more BSSRUs and uses the optical-to-electrical converter to convert the optical signal that it receives from one or more BSSRUs to F1 radio frequency band in order to transmit to one or more UEs.

18. A wireless communication system comprising a Base Band Unit (BBU), one or more Base Station Side Radio Units (BSSRUs), and one or more User Equipment Side Radio Units (UESRUs), wherein the BBU through the BSSRU(s) performs MIMO beamforming with, multiple UESRUs to communicate with them using the same time and frequency resources in a F2 frequency band, and a UESRU selected from said multiple UESRUs with a plural of radio transmitting and receiving paths and antennas, or a plural of UESRUs selected from said multiple UESRUs collectively, communicate in a F1 frequency band with a plural of UEs distributed over a coverage area of the UESRU or the plural of UESRUs using MU-MIMO spatial multiplexing.

19. The wireless communication system in claim 18 wherein the one or more BSSRUs are integrated with the BBU.

20. The wireless communication system in claim 18 wherein some of the one or more BSSRUs are distributed in the coverage area of the rest of BSSRUs integrated with the BBU.

21. The wireless communication system in claim 18 wherein the BS estimates the Equivalent Total Channel (ETC) of the wireless links between the BS and the plural of UEs and performs spatial multiplexing beamforming to communicate with the UEs through the ETC, wherein the ETC includes an effect of the BSSRU(s) and the UESRU(s) and performing spatial multiplexing beamforming further comprises computing a precoding matrix using estimates of the ETC and applying the precoding matrix to the signals before transmitting, and/or computing a detection matrix using estimates of the ETC and applying the detection matrix to the received signals.

22. The wireless communication system in claim 18 wherein the BS performs spatial multiplexing beamforming in the F1 frequency band to directly communicate with one or more UEs at the same time as it performs spatial multiplexing beamforming in the F2 frequency band to communicate with one or more UESRUs which communicates with one or more UEs in the F1 frequency band.

* * * * *